US010698595B1

(12) United States Patent
Saragadam et al.

(10) Patent No.: US 10,698,595 B1
(45) Date of Patent: Jun. 30, 2020

(54) SUPPORT FOR SWIMLANES IN A MOBILE GRAPHICAL USER INTERFACE

(71) Applicant: ServiceNow, Inc., Santa Clara, CA (US)

(72) Inventors: Chaitanya Saragadam, Hyderabad (IN); Mohammed Furqan Mohammed, Hyderabad (IN); Sancho Savio Pinto, Alameda, CA (US); Tejas Mohan Sumant, Pune (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/457,407

(22) Filed: Jun. 28, 2019

(51) Int. Cl.
*G06F 3/048* (2013.01)
*G06F 3/0486* (2013.01)
*G06F 3/0484* (2013.01)
*G06F 3/0488* (2013.01)

(52) U.S. Cl.
CPC ........ *G06F 3/0486* (2013.01); *G06F 3/04842* (2013.01); *G06F 3/04847* (2013.01); *G06F 3/04886* (2013.01)

(58) Field of Classification Search
CPC .............. G06F 3/0486; G06F 3/04842; G06F 3/04847; G06F 3/04886
USPC ........................................................ 715/769
See application file for complete search history.

(56) References Cited

U.S. PATENT DOCUMENTS

| 7,062,683 | B2 | 6/2006 | Warpenburg |
| 7,610,512 | B2 | 10/2009 | Gerber |
| 7,617,073 | B2 | 11/2009 | Trinon |
| 7,890,802 | B2 | 2/2011 | Gerber |
| 7,945,680 | B2 | 5/2011 | Vamenepe |
| 7,966,398 | B2 | 6/2011 | Wiles |
| 8,224,683 | B2 | 7/2012 | Manos |
| 8,674,992 | B2 | 3/2014 | Poston |

OTHER PUBLICATIONS

"ServiceNow London Platform Capabilities", ServiceNow Docs, Apr. 4 2019, 59 pages.
Miriyala, U.S. Appl. No. 16/380,784, filed Apr. 10, 2019, 52 pages.

*Primary Examiner* — Andrey Belousov
(74) *Attorney, Agent, or Firm* — Fletcher Yoder LLP

(57) ABSTRACT

A server device may transmit, to a client device, data and program code that instructs the client device to display a graphical user interface (GUI). The GUI may include cards associated with a first categorical group of a first plurality of categorical groups and a second categorical group of a second plurality of categorical groups. The toggling, dragging, and releasing of a particular card causes the GUI to: (i) display a grid interface containing vertical lanes associated with the first plurality of categorical groups and horizontal lanes associated with the second plurality of categorical groups, wherein intersections of vertical lanes and horizontal lanes define graphical boxes, (ii) slide the particular card among the graphical boxes, and (iii) associate the particular card with a third categorical group or a fourth categorical group defined by the graphical box that the particular card is released.

20 Claims, 13 Drawing Sheets

700 — OBTAIN, FROM PERSISTENT STORAGE, DATA REPRESENTING A DEFINITION OF A FIRST PLURALITY OF CATEGORICAL GROUPS, A DEFINITION OF A SECOND PLURALITY OF CATEGORICAL GROUPS, AND A PLURALITY OF INFORMATION ITEMS, EACH ASSOCIATED WITH ONE OF THE FIRST PLURALITY OF CATEGORICAL GROUPS AND ONE OF THE SECOND PLURALITY OF CATEGORICAL GROUPS

710 — TRANSMIT, TO A CLIENT DEVICE, THE DATA AND PROGRAM CODE THAT INSTRUCTS THE CLIENT DEVICE TO GENERATE AND DISPLAY A GRAPHICAL USER INTERFACE USING THE DATA, WHEREIN THE GRAPHICAL USER INTERFACE INCLUDES A SET OF CARDS REPRESENTING INFORMATION ITEMS ASSOCIATED WITH A FIRST CATEGORICAL GROUP OF THE FIRST PLURALITY OF CATEGORICAL GROUPS AND A SECOND CATEGORICAL GROUP OF THE SECOND PLURALITY OF CATEGORICAL GROUPS, AND WHEREIN TOGGLING, DRAGGING, AND RELEASING OF A PARTICULAR CARD OF THE SET OF CARDS CAUSES THE GRAPHICAL USER INTERFACE TO: (I) IN RESPONSE TO THE TOGGLING, AUTOMATICALLY DISPLAY A GRID INTERFACE, WHEREIN THE GRID INTERFACE CONTAINS A SET OF VERTICAL LANES RESPECTIVELY ASSOCIATED WITH AT LEAST SOME OF THE FIRST PLURALITY OF CATEGORICAL GROUPS AND A SET OF HORIZONTAL LANES RESPECTIVELY ASSOCIATED WITH AT LEAST SOME OF THE SECOND PLURALITY OF CATEGORICAL GROUPS, WHEREIN INTERSECTIONS OF VERTICAL LANES AND HORIZONTAL LANES DEFINE GRAPHICAL BOXES, WHEREIN THE PARTICULAR CARD IS INITIALLY LOCATED IN A FIRST GRAPHICAL BOX OF THE GRAPHICAL BOXES, (II) IN RESPONSE TO THE DRAGGING, SLIDE THE PARTICULAR CARD AMONG THE GRAPHICAL BOXES OF THE GRID INTERFACE, AND (III) IN RESPONSE TO THE RELEASING, ASSOCIATE THE INFORMATION ITEM REPRESENTED BY THE PARTICULAR CARD WITH A THIRD CATEGORICAL GROUP OF THE FIRST PLURALITY OF CATEGORICAL GROUPS OR A FOURTH CATEGORICAL GROUP OF THE SECOND PLURALITY OF CATEGORICAL GROUPS, WHEREIN THE PARTICULAR CARD IS RELEASED IN A SECOND GRAPHICAL BOX OF THE GRAPHICAL BOXES THAT IS DEFINED BY AT LEAST ONE OF THE THIRD CATEGORICAL GROUP OR THE FOURTH CATEGORICAL GROUP

FIG. 7

SUPPORT FOR SWIMLANES IN A MOBILE GRAPHICAL USER INTERFACE

BACKGROUND

Graphical user interfaces (GUIs) allow users to engage with software applications through graphical icons and visual indicators. Compared to text-based or command line user interfaces, which depend on users memorizing command words, GUIs provide an easy, less error prone approach for interacting with software applications. GUIs can take on many forms. Some GUIs may be, for instance, web-based GUIs that can be presented a display screen of a mobile device.

In many circumstances, the arrangement of graphical elements within a GUI can be constrained by the physical size of a display screen. Users that want to modify the arrangement of the graphical elements may find the process overly time consuming or unintuitive. This can limit the ability for users to tailor the GUI layout to support their individual preferences.

SUMMARY

Generally, users access GUIs by way of web-connected devices, such as mobile devices, though native GUIs may also be supported on these devices. Such devices may include display screens (e.g., monitors, touch screens, and other digital displays) through which users can view and interact with the GUIs.

In some situations, a GUI may be configured with graphical lanes that represent categorical groupings of graphical elements on the GUI. For example, lanes can represent priorities associated with the graphical elements (high, medium, low, and so on). When displayed on the GUI, lanes may appear parallel in relation to each other and may be configured vertically (e.g., each lane parallel to the y-axis of the GUI) or horizontally (e.g., each lane parallel to the x-axis of the GUI). Each graphical element may be displayed on the GUI in a graphical lane that corresponds to the categorical group of the graphical element. As a result, graphical lanes can help communicate complex details, for example, graphical elements representing items of various priorities, through a simple visual representation.

Sometimes, a GUI configured with several graphical lanes may be too large to fit on a display screen. This is especially true with mobile device or tablet displays, which may have display screens with diagonal lengths of less than 7 inches or 13 inches, respectively. If the GUI is larger than the physical size of the display screen, only a portion of the GUI may be viewed on the display. And as a result, a user may be unable to view relevant information on the GUI. Instead, the user may have to scroll through and/or otherwise interact with the GUI to find relevant information. While the GUI may eventually provide the relevant information the user is looking for, the process of finding the information may be unduly time consuming.

Additionally, having a limited display screen size may affect the functionality available to a user. For example, certain buttons, menus, or dropdowns within a GUI may be obscured to prevent the GUI from being crammed with excessive information. This design choice can unwittingly make performing certain functions overly challenging. For instance, if a mobile user wishes to modify a categorical group of a graphical element within the GUI, the user may find the process to be highly involved and time consuming, containing multiple disjoint steps that can cause frustration and weariness.

To address these issues, a GUI could be designed with an option to display graphical lanes via a grid interface. Using this grid interface, a user can view a greater number of graphical lanes and, in turn, may be more informed when making decisions regarding the repositioning of graphical elements. Moreover, the design of the grid interface may be intuitive and easily accessible via devices with limited displays screen sizes. In particular, the design may be such that the user will not be flooded with extraneous information, but instead can easily navigate the grid interface to quickly perform operations.

Advantageously, the embodiments herein may provide a single "click and drag" mechanism that allows a user to modify the categorical group of a graphical element without having to perform complicated or time consuming actions. As such, the embodiments herein allow users to quickly rearrange GUIs to support their individual needs. Other advantages and improvements are possible.

Accordingly, a first example embodiment may involve persistent storage containing data representing: a definition of a first plurality of categorical groups, a definition of a second plurality of categorical groups, and a plurality of information items, each associated with one of the first plurality of categorical groups and one of the second plurality of categorical groups. The first example embodiment may also involve a server device configured to transmit, to a client device, the data and program code that instructs the client device to generate and display a graphical user interface using the data. The graphical user interface may include a set of cards representing information items associated with a first categorical group of the first plurality of categorical groups and a second categorical group of the second plurality of categorical groups. The graphical user interface may also be configured such that the toggling, dragging, and releasing of a particular card of the set of cards causes the graphical user interface to: (i) in response to the toggling, automatically display a grid interface, wherein the grid interface contains a set of vertical lanes respectively associated with at least some of the first plurality of categorical groups and a set of horizontal lanes respectively associated with at least some of the second plurality of categorical groups, wherein intersections of vertical lanes and horizontal lanes define graphical boxes, wherein the particular card is initially located in a first graphical box of the graphical boxes, (ii) in response to the dragging, slide the particular card among the graphical boxes of the grid interface, and (iii) in response to the releasing, associate the information item represented by the particular card with a third categorical group of the first plurality of categorical groups or a fourth categorical group of the second plurality of categorical groups, wherein the particular card is released in a second graphical box of the graphical boxes that is defined by at least one of the third categorical group or the fourth categorical group.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 is a flow chart, in accordance with example embodiments.

DETAILED DESCRIPTION

Figure 1:
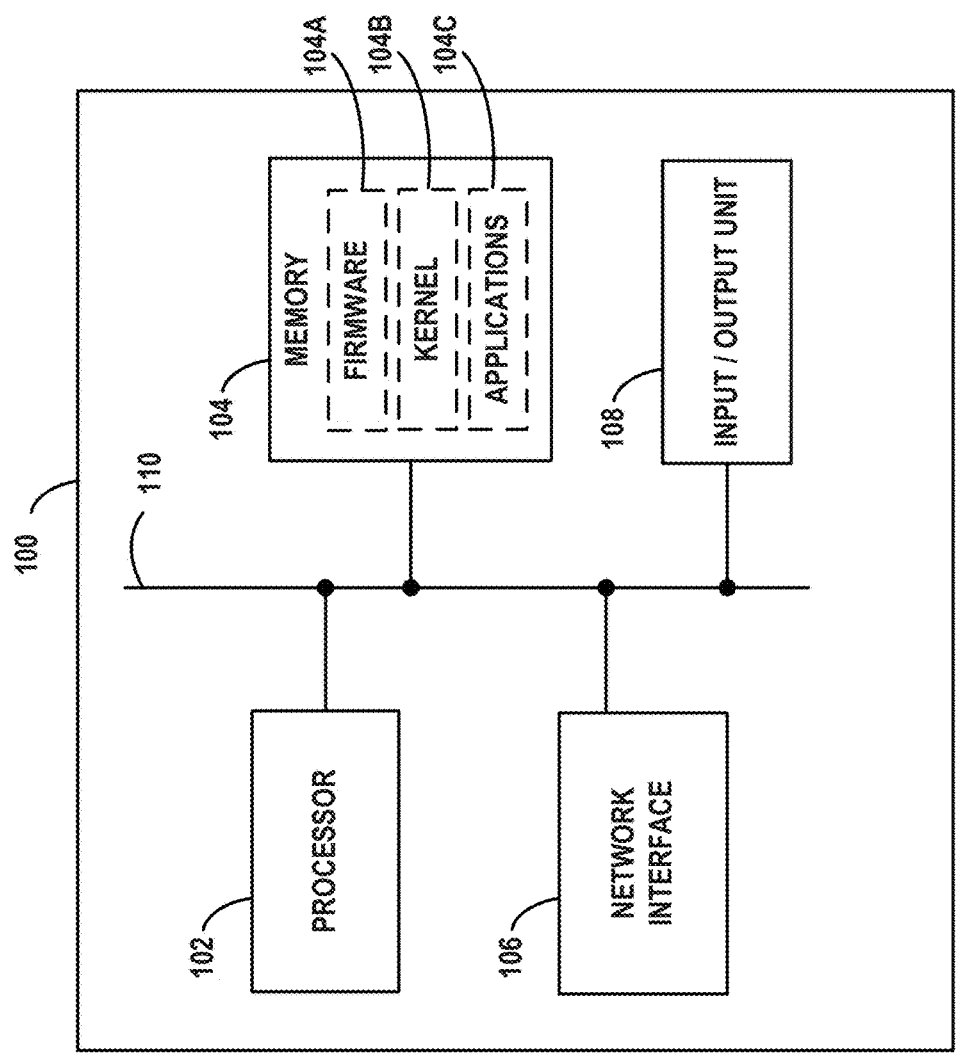
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
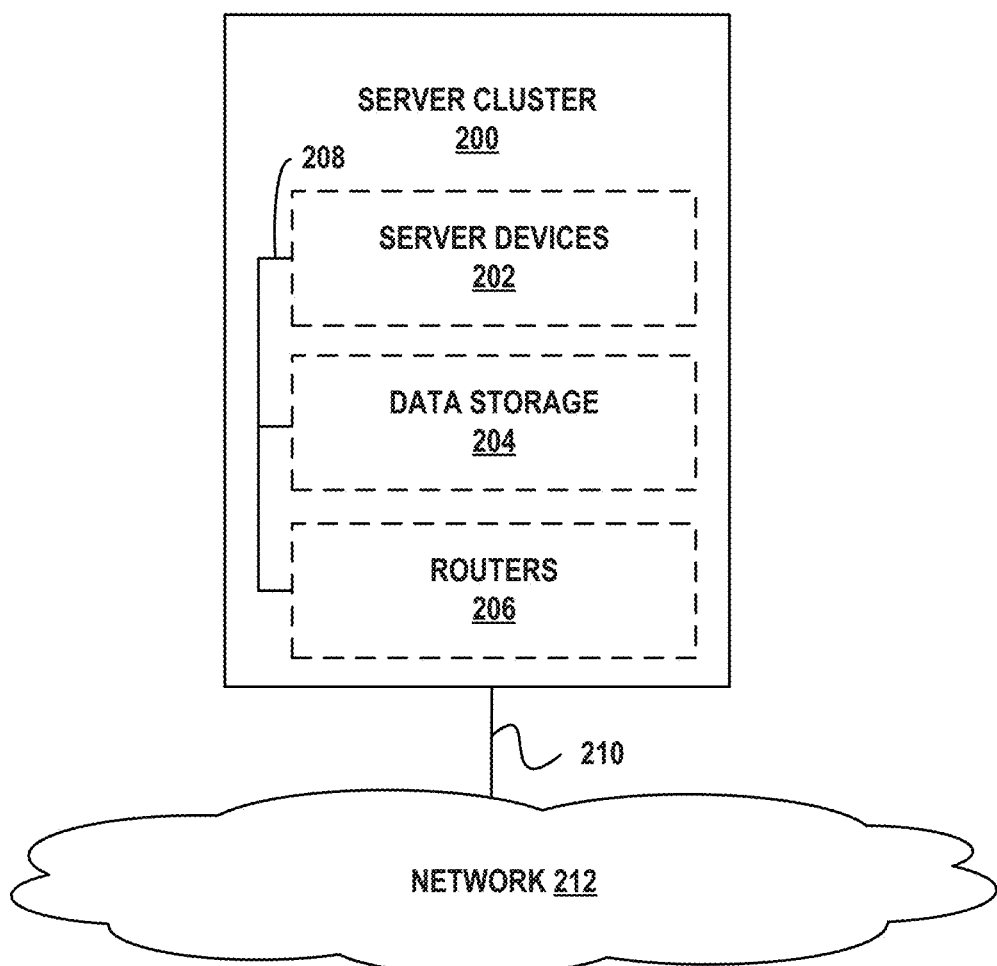
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
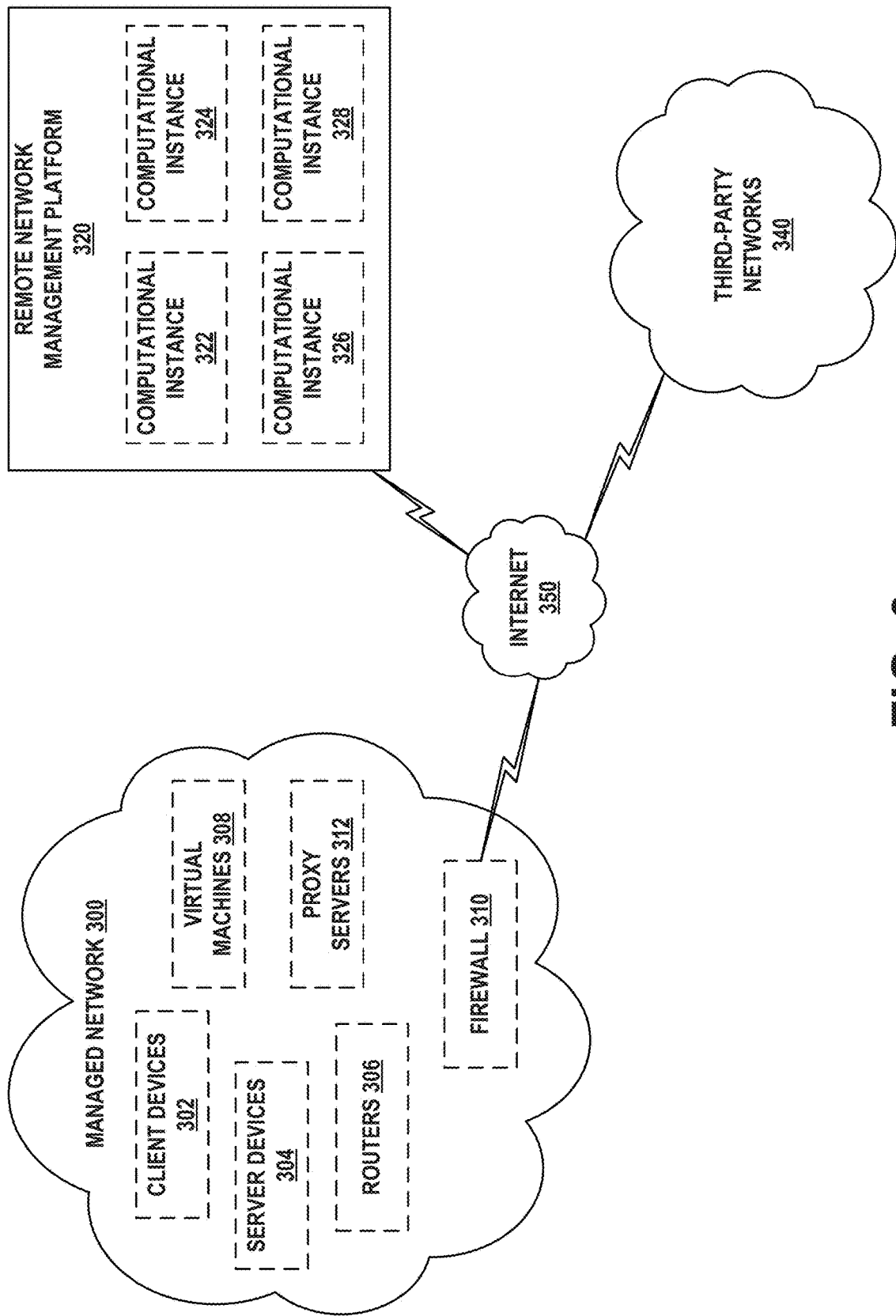
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
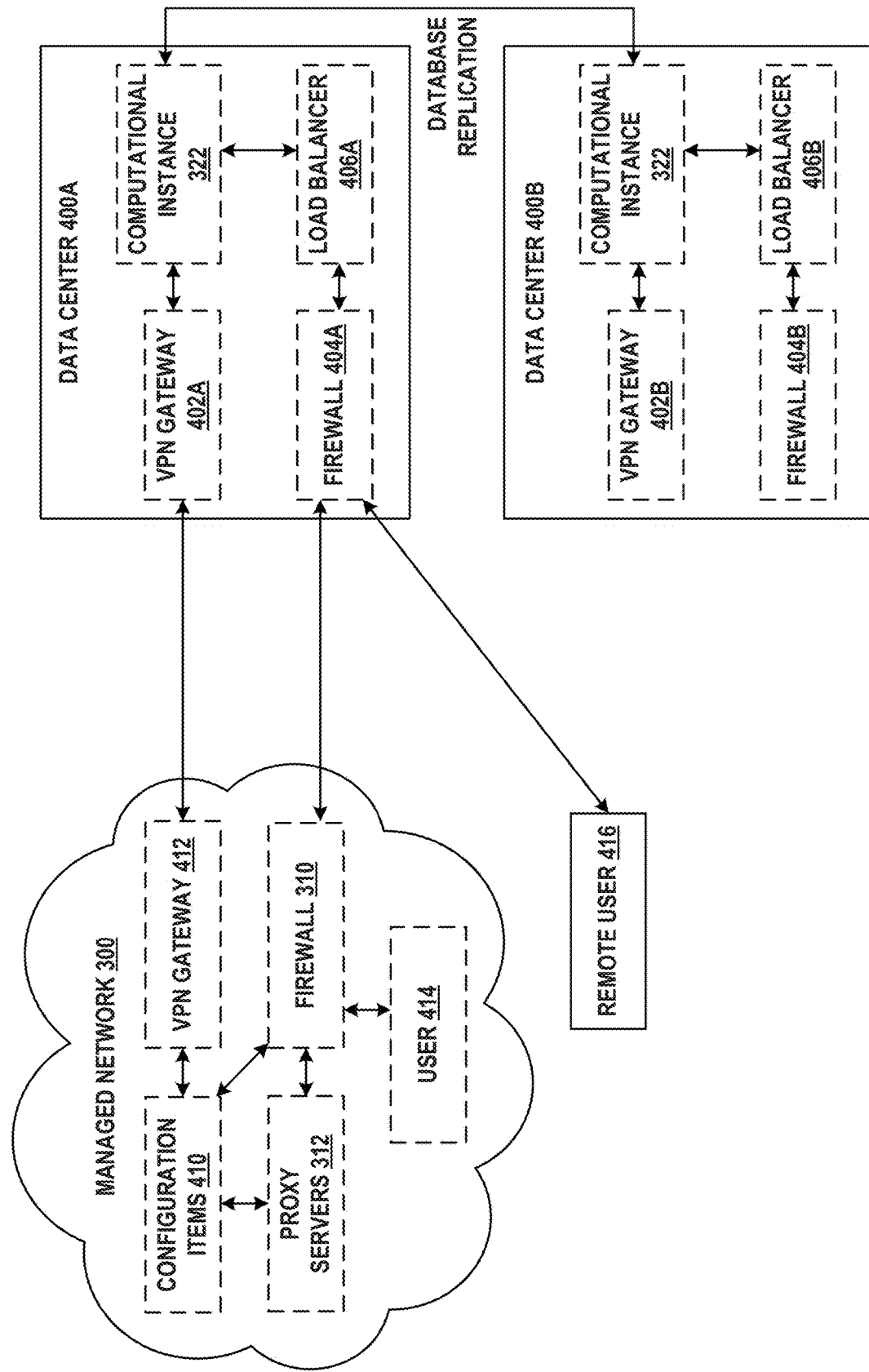
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
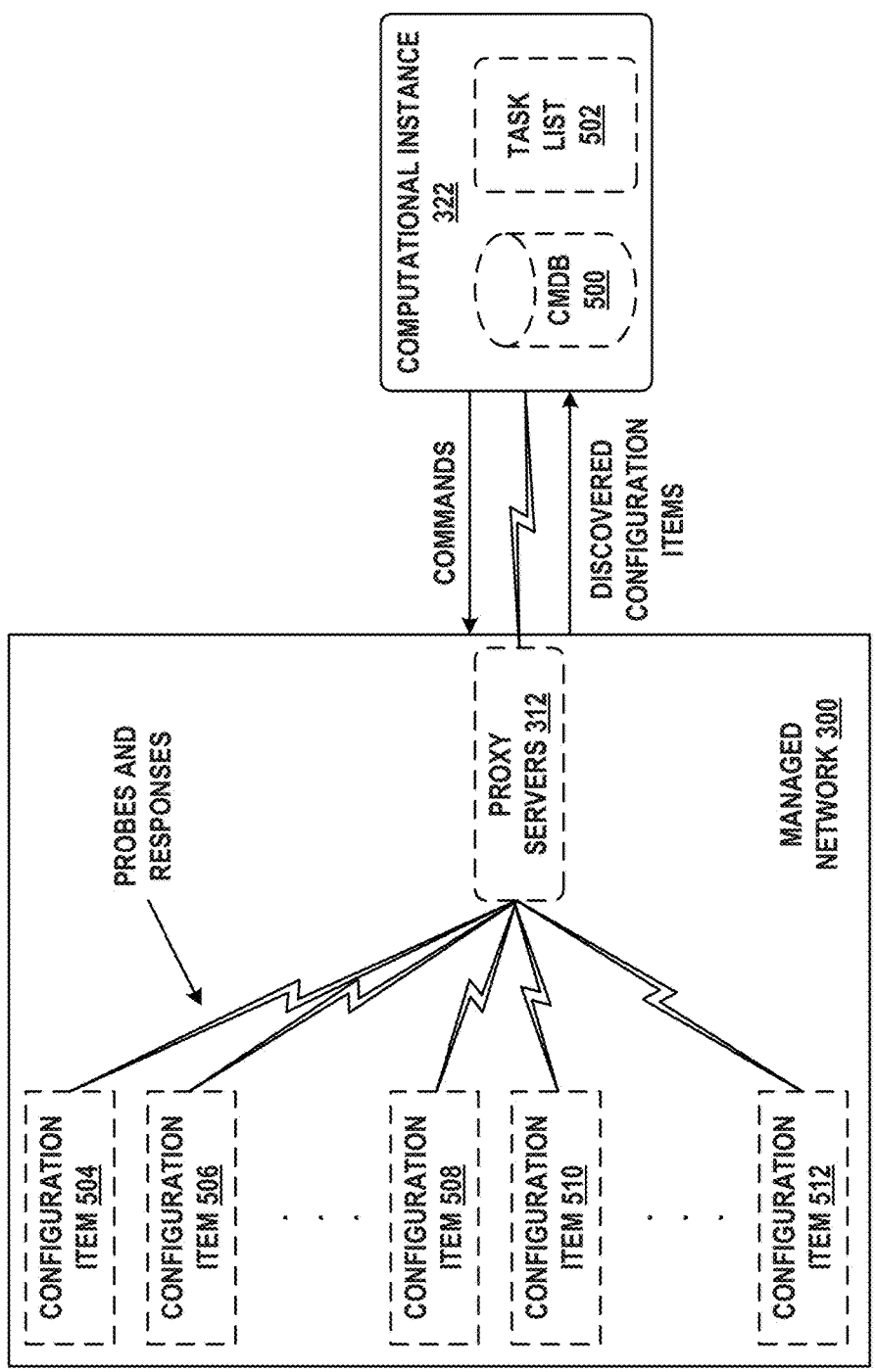
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
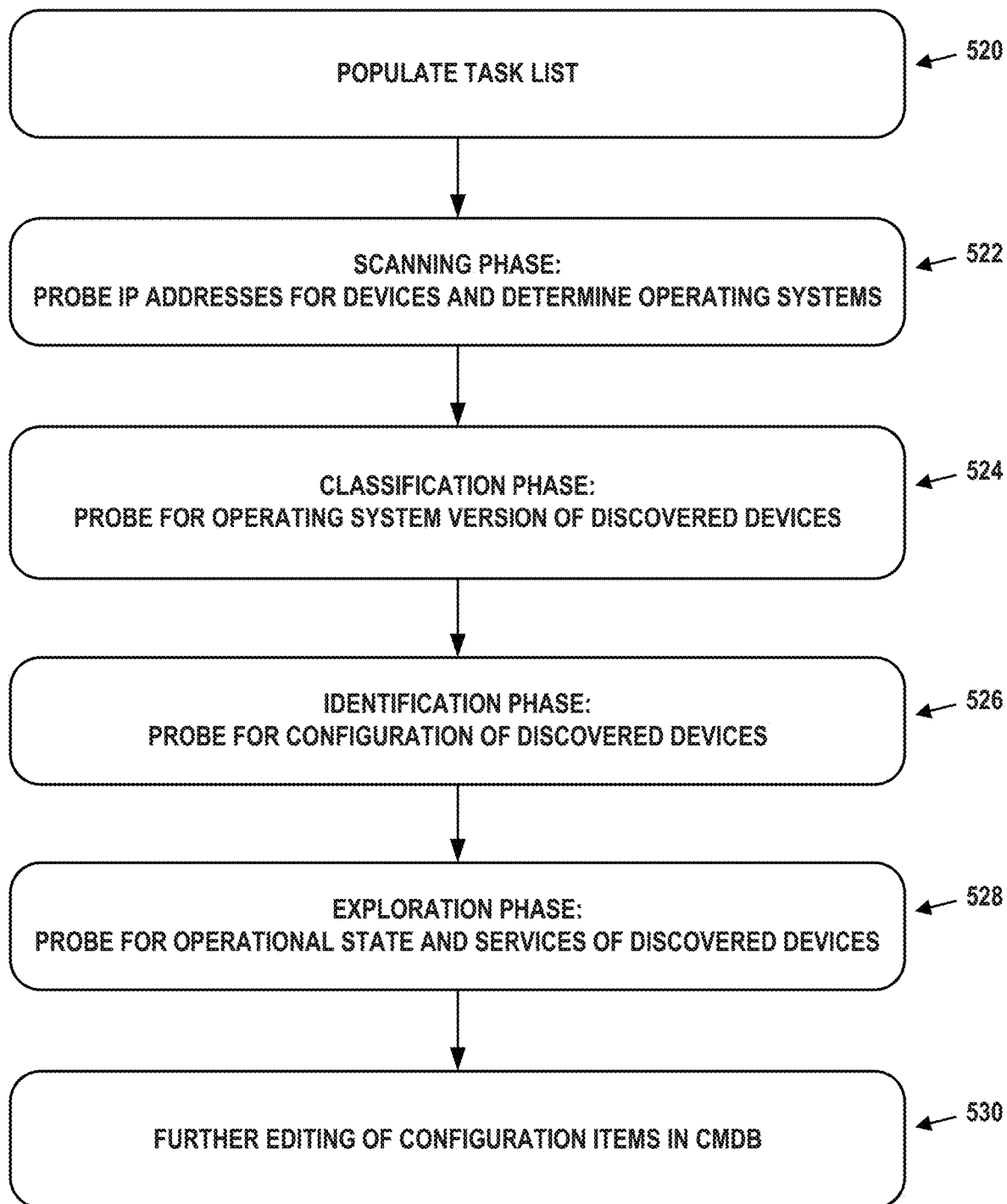
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. IMPROVED GRAPHICAL LANE MANAGEMENT IN A MOBILE INTERFACE

As described herein, the term "information items" may refer to data associated with managed network 300 and/or computational instance 322. For example, information items may include tasks that are to be completed by the entity associated with managed network 300, computational resources utilized by managed network 300, and so on. But information items need not be associated with managed network 300 and may refer to any type of data. Within a GUI, information items may be represented as graphical elements, or herein referred to as "cards". As also described herein, "lanes" may be GUI components that can be used to structure the display of cards or other information within a GUI. The GUIs and/or lanes described herein may be provided to users when they access server devices, for example, a computational instance on a remote network management platform, such as computational instance 322 within remote network management platform 320 as described in FIG. 3.

As previously described, a GUI may be displayed on a device with a limited display screen size, thus reducing the extent to of information that can be displayed in the GUI. As a result, finding information on the GUI and performing certain functions on the GUI may be overly challenging and time consuming. The embodiments herein address these limitations through the use of a grid interface. As a result of these embodiments, users can be provided with an intuitive procedure to quickly to modify the categorical group of a graphical element without having to perform complicated or time consuming actions. An example GUI 600 is shown in FIGS. 6A, 6B, 6C, 6D, and 6E. As illustrated by the description below, the variation of GUI 600 from FIG. 6A to FIG. 6E can represent how a user can modify categorical groups of cards within GUI 600.

Moreover, while the embodiments herein may be discussed in connection with GUIs related with task management applications, information items that represent tasks, and lanes that represent categories of those tasks, these are used solely as a convenient conceptual representation and are not intended to be limiting with respect to example embodiments or techniques described herein. In practice, the embodiments or techniques described herein can be applied across a wide variety of scenarios that involve GUIs with lanes and graphical elements (e.g., cards, containers, or widgets) disposed within those lanes.

Figure 6A:
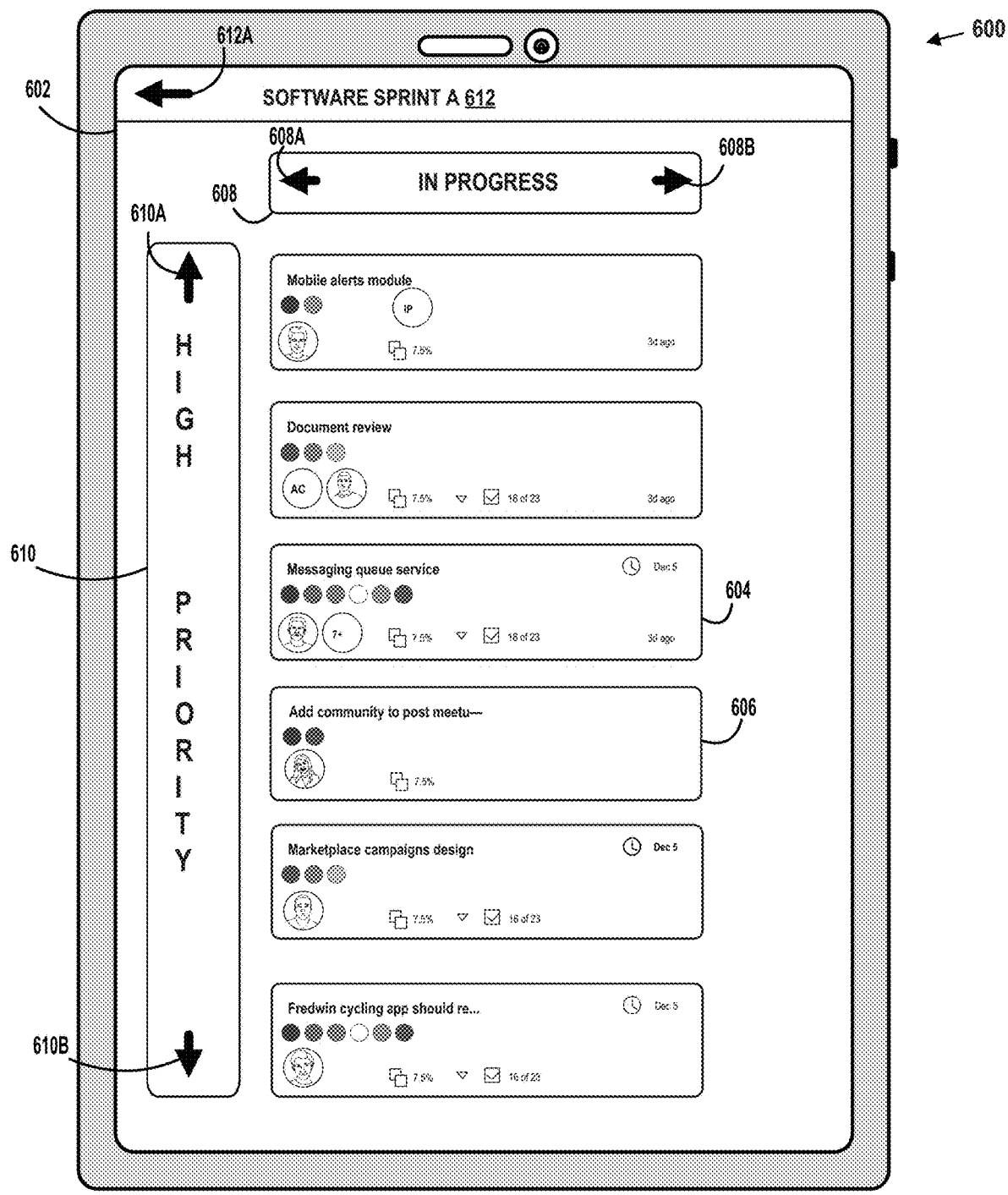
FIG. 6A depicts a view of GUI, in accordance with example embodiments.

FIG. 6A depicts a view of GUI 600 with expanded cards, in accordance with example embodiments. In particular, GUI 600 is presented on display screen 602, which may be a display screen on a mobile device, tablet device, or other type of device. GUI 600 of FIG. 6A includes cards 604 and 606, horizontal header 608, vertical header 610, and title 612.

Cards 604 and 606 may be visual user interface elements that represent information items. In particular, cards 604 and 606 may be two cards of a plurality of cards on GUI 600. The data used to populate cards 604 and 606 may be stored, for example, in persistent storage on computational instance 322 and provided to the user upon requesting GUI 600.

Cards 604 and 606 may display the caption/title of the information items that they represent. For example, card 604 may be titled "Messaging queue service" and card 606 may be titled "Add community to post meetu . . . ," (where GUI 600 omits the remaining part of the caption/title for brevity). Additionally, cards 604 and 606 can display metrics, such as the date the card was created, users assigned to the card, and so on.

Each card on GUI 600 may also contain a handle component (not shown) that allows users to drag the card around GUI 600. In practice, dragging a card on GUI 600 can involve a user selecting (or otherwise activating) the card via a click, a touch, or other trigger mechanism and then moving the selected card around display screen 602.

Horizontal header 608 may represent a categorical group from a first plurality of categorical groups. As noted above, categorical groups may represent collections of information items. For example, given that information items can represent tasks that are to be completed by the entity associated with managed network 300, each categorical group from the first plurality of categorical groups may specify progress toward the completion of the task (e.g., to do, in progress, testing, and done). The data to (i) define the first plurality of categorical groups and (ii) to associate each information item with a categorical group from the first plurality of categorical groups may be stored, for example, in persistent storage on computational instance 322 and provided to the user upon requesting GUI 600.

In examples, GUI 600 may display cards that are associated with the categorical group specified by horizontal header 608. For instance, as shown in FIG. 6A, the cards displayed in GUI 600 may be associated with information items within the "In Progress" categorical group. To change the view of GUI 600 to display cards associated with a different categorical group, a user may use buttons 608A and 608B. For instance, pressing button 608A may display cards associated with information items within the "To Do" categorical group, while pressing button 608B may display cards associated with information items within the "Testing" categorical group.

Vertical header 610 may represent a categorical group from a second plurality of categorical groups. Like the first plurality of categorical groups, the second plurality of categorical groups may also represent groupings of information items. For example, given that information items can represent tasks that are to be completed by the entity associated with managed network 300, each categorical group from the second plurality of categorical groups may specify the priority of the task (e.g., no priority, low priority, high priority, urgent, and critical). The data to (i) define the second plurality of categorical groups and (ii) to associate each information item with a categorical group from the second plurality of categorical groups may be stored, for example, in persistent storage on computational instance 322 and provided to the user upon requesting GUI 600.

In examples, GUI 600 may display cards that are associated with the second categorical group specified by vertical header 610. For instance, as shown in FIG. 6A, the cards displayed in GUI 600 may be associated with information items within the "High Priority" second categorical group. To change the view of GUI 600 to display cards associated with a different second categorical group, a user may use buttons 610A and 610B. For instance, pressing button 610A may display cards associated with information items within the "Low Priority" second categorical group, while pressing button 610B may display cards associated with information items within the "Urgent" second categorical group.

Notably, the first plurality of categorical groups may be mutually exclusive from the second plurality of categorical groups. That is, a categorical group might not be able to be simultaneously in the first plurality of categorical groups and in the second plurality of categorical groups. It follows that an information item can concurrently be associated with one of the first plurality of categorical groups and associated with one of the second plurality of categorical groups, but might not be concurrently associated with two categorical groups from the first plurality of categorical groups or two categorical groups from the second plurality of categorical groups.

Taking this concept even further, pressing buttons 608A or 608B does not affect vertical header 610. Specifically, if the user were to press button 608A, GUI 600 may display cards associated with information items in the "To Do" categorical group, however the displayed cards would still be associated with the "High Priority" second categorical group. Likewise, pressing buttons 610A or 610B does not affect horizontal header 608. Specifically, if a user were to press button 610A, GUI 600 may display cards associated with information items in the "Low Priority" second categorical group, however the displayed cards would still be associated with the "In Progress" categorical group.

Title 612 may be used to indicate the function of the information displayed in GUI 600. For instance, as shown in FIG. 6A, the elements of GUI 600 may be used to manage a software sprint. As such, pressing back button 612A may cause GUI 600 to display a view of all functions that GUI 600 may support, each of which may have their own cards and categorical groups.

Figure 6B:
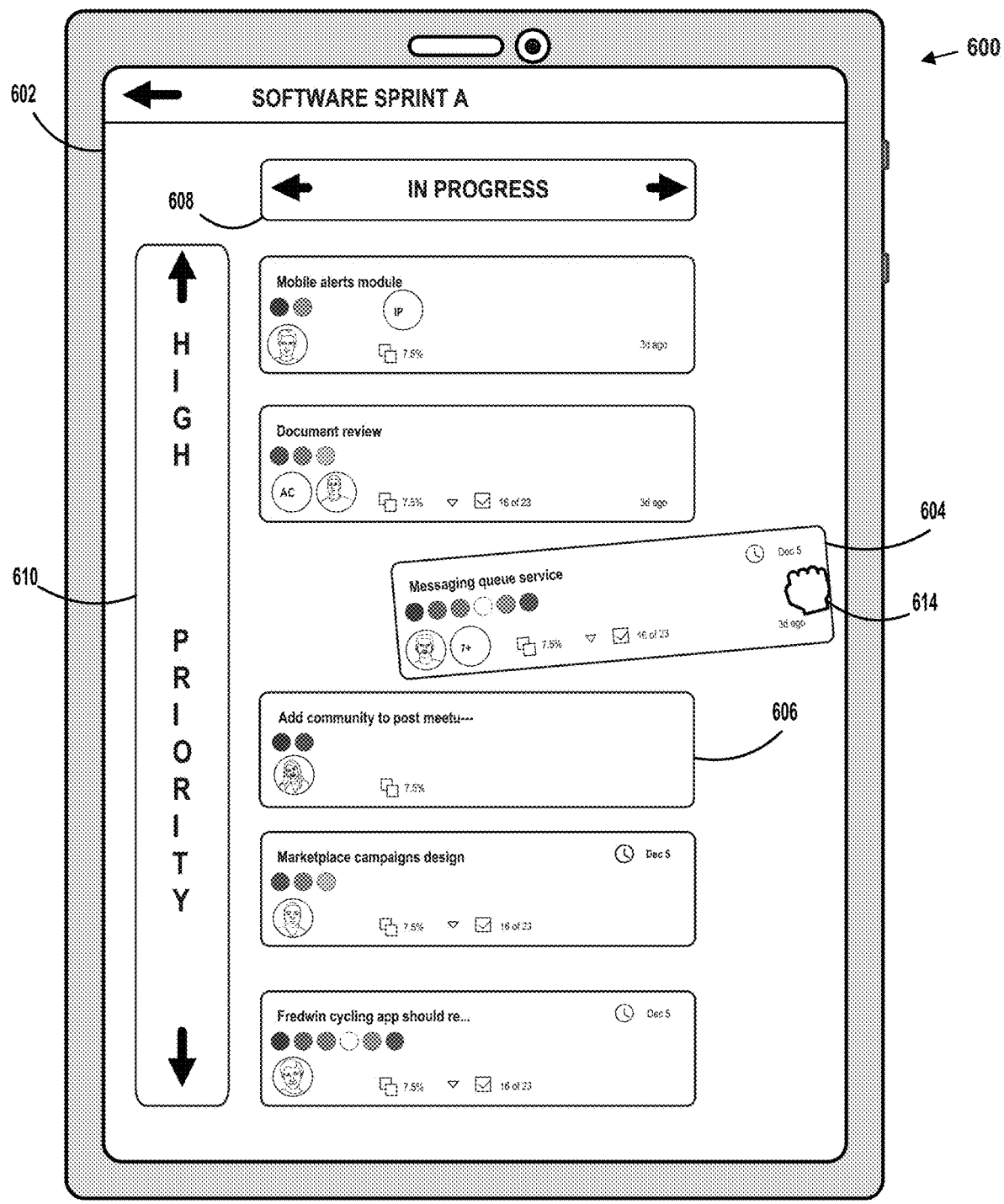
FIG. 6B depicts a view of a GUI, in accordance with example embodiments.

FIG. 6B depicts a view of GUI 600 with a toggled card, in accordance with example embodiments. The view of FIG. 6B may be displayed, for example, when a user selects and begins to move card 604, as illustrated by drag icon 614. GUI 600 of FIG. 6B is still displayed on display screen 602 and includes the same cards 604 and 606, horizontal header 608, and vertical header 610 as FIG. 6A, however references to buttons 608A, 608B, 610A, 610B, and title 612 have been omitted for brevity.

As may be seen by comparing FIG. 6B to FIG. 6A, the selection and dragging of card 604 temporarily modifies the position of card 604 relative to the other cards on GUI 600. In some cases, the user may select and drag card 604 in order to change the position of card 604 relative to the other cards on GUI 600. For example, if the user drags card 604 downward toward the location of card 606, the positions of card 604 and card 606 may automatically switch.

Additionally and/or alternatively, the user may select and drag card 604 to modify the categorical groups associated with card 604. This type of selecting and dragging may be referred to as "toggling". To differentiate toggling from other types actions that may be performed on card 604, toggling, as used herein, may include selecting and moving a card 604 to the edge of display screen 602. In short, the act of toggling indicates that the user wishes to switch a categorical group of card 604 and does not wish to modify the relative position of card 604 within its current categorical groups. Upon toggling card 604, GUI 600 may present a grid interface to the user.

Figure 6C:
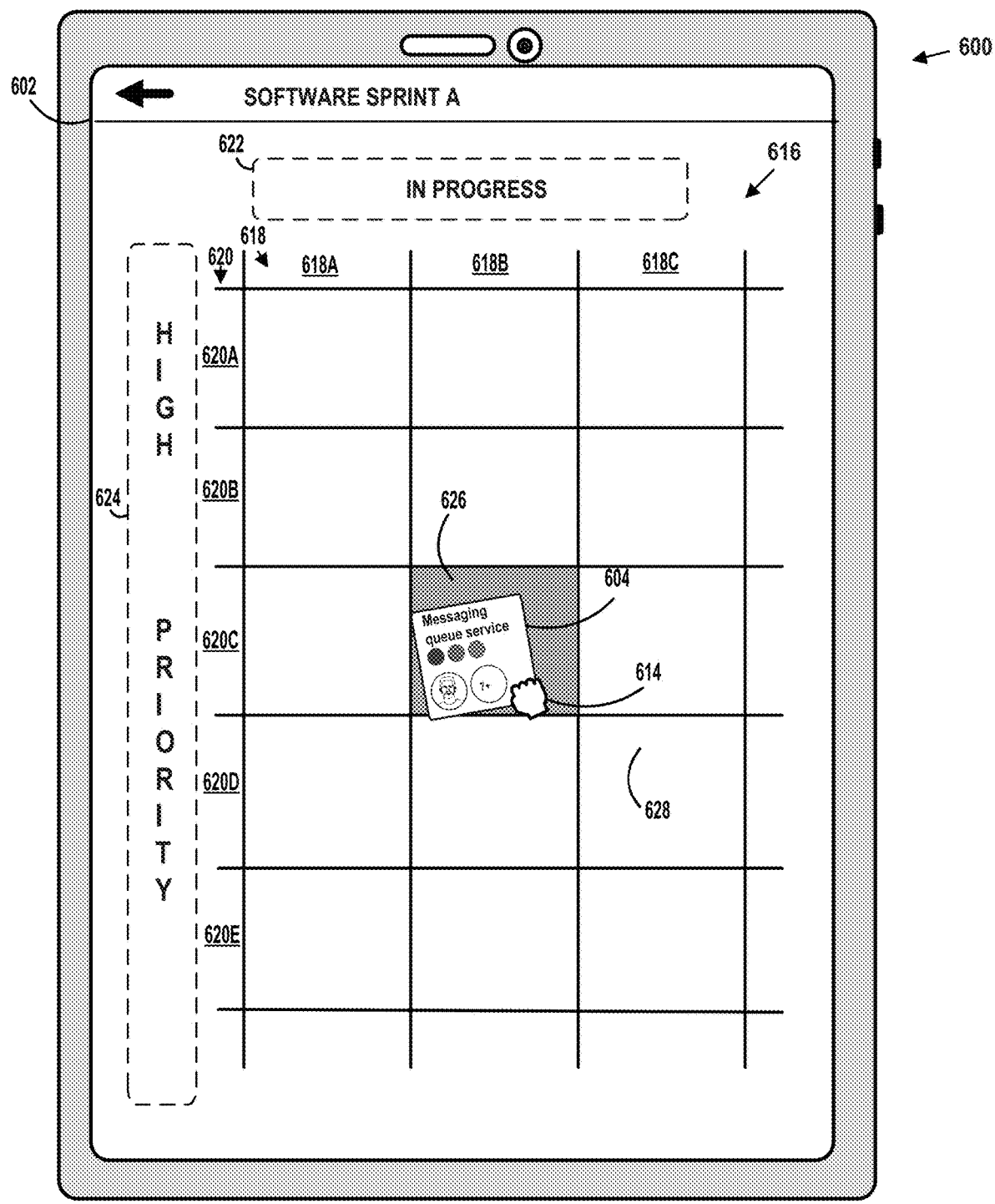
FIG. 6C depicts a view of GUI in accordance with example embodiments.

FIG. 6C depicts a view of GUI 600 with a grid interface, in accordance with example embodiments. The view of FIG. 6C may be displayed, for example, when the user toggles card 604 by selecting and moving card 604 to the edge of display screen 602. GUI 600 of FIG. 6C is still displayed on display screen 602 and includes the same card 604 and drag icon 614 as FIG. 6B. However, GUI 600 in FIG. 6C does not display horizontal header 608 and vertical header 610. Instead, FIG. 6C includes grid interface 616, horizontal caption 622, and vertical caption 624.

Grid interface 616 may contain a set of vertical lanes 618, including vertical lane 618A, vertical lane 618B, and vertical lane 618C. The set of vertical lanes 618 may be respectively associated with at least some of the first plurality of categorical groups. Continuing from the previous example, vertical lane 618A may represent the "To Do" categorical group, vertical lane 618B may represent "In Progress" categorical group, and vertical lane 618C may represent the "Testing" categorical group.

Grid interface 616 may also contain a set of horizontal lanes 620, including horizontal lane 620A, horizontal lane 620B, horizontal lane 620C, horizontal lane 620D, and horizontal lane 620E. The set of horizontal lanes 620 may be respectively associated with at least some of the second plurality of categorical groups. Further continuing from the above example, horizontal lane 620A may represent the "No Priority" second categorical group, horizontal lane 620B may represent the "Low Priority" second categorical group, horizontal lane 620C may represent the "High Priority" second categorical group, horizontal lane 620D may represent the "Urgent" second categorical group, and horizontal lane 620E may represent the "Critical" second categorical group.

In examples, the size of display screen 602 may restrict the number of vertical and horizontal lanes capable of being displayed on grid interface 616. For instance, the set of vertical lanes 618 are shown to include vertical lane 618A, vertical lane 618B, and vertical lane 618C. Yet in reality, the set of vertical lanes 618 can include other of verticals lanes, perhaps vertical lane 618D or vertical lane 618E, that correspond to different categorical groups from the first plurality of categorical groups. Likewise, the set of horizontal lanes 620 are shown to display horizontal lane 620A, horizontal lane 620B, horizontal lane 620C, horizontal lane 620D, and horizontal lane 620E. Yet in reality, the set of horizontal lanes 620 can include other horizontal lanes, perhaps horizontal lane 620F or horizontal lane 620G, that correspond to different categorical groups from the second plurality of categorical groups. As referred to herein, a vertical lane or a horizontal lane not currently displayed in grid interface 616 may be referred to as a "hidden" lane. To display "hidden" lanes, a user may slide card 604 to or toward a particular edge of display screen 602, which can cause grid interface 616 to display (e.g., scroll to) a new set of vertical lanes or a new set of horizontal lanes collectively containing at least one lane not in the set of vertical lanes 618 or the set of horizontal lanes 620. More specifically, sliding card 604 to or toward the vertical edges of display screen 602 may cause grid interface 616 to display a new set of vertical lanes, whereas sliding card 604 to or toward the horizontal edges of display screen 602 may cause grid interface 616 to display a new set of horizontal lanes.

Intersections of the set of verticals lanes 618 and the set of horizontal lanes 620 define graphical boxes. In particular, each graphical box in grid interface 616 may be defined by the specific categorical groups that are associated with the graphical box. For instance, graphical box 626, which rests on the intersection of vertical lane 618B and horizontal lane 620C, may be defined by the categorical group associated with vertical lane 618B (e.g., "In Progress") and the categorical group associated with horizontal lane 620C (e.g., "High Priority"). As another example, graphical box 628, which rests on the intersection of vertical lane 618C and horizontal lane 620D, may be defined by the categorical group associated with vertical lane 618C (e.g., "Testing") and the categorical group associated with horizontal lane 620D (e.g., "Urgent"). In some cases, when first displaying grid interface 616, GUI 600 may be configured to position card 604 within a graphical box that is defined by the categorical groups currently associated with card 604. For example, as shown in FIG. 6B, card 604 may be associated with the "In Progress" and the "High Priority" categorical groups. Accordingly, card 604 may be initially positioned in graphical box 626.

To modify the categorical groups associated with card 604, a user can drag card 604 from graphical box 626 into any of the graphical boxes of grid interface 616. For example, if the user wishes to associate card 604 with the "Testing" categorical group and the "Urgent" second categorical group, the user may drag card 604 from graphical box 626 to graphical box 628.

In some embodiments, during the dragging of card 604 among the graphical boxes of the grid interface 616, GUI 600 is configured to display names of categorical groups respectively associated with the graphical boxes that card 604 is sliding across. In particular, the name of the first categorical group (e.g., the vertical lane that defines the graphical box) may be displayed on horizontal caption 622, while the name of the second categorical group (e.g., the horizontal lane that defines the graphical box) may be displayed on vertical caption 624.

In some embodiments, the number of vertical lanes and the number of horizontal lanes displayed on grid interface 616 can be each based on the size of display screen 602. In other words, the number of lanes in either the set of verticals lanes 618 or the set of horizontal lanes 620 may be based on the dimensions of display screen 602.

In some embodiments, the size of graphical boxes within grid interface 616 may be based on the size of display screen 602. In other words, grid interface 616 may be configured such that a predefined number of the graphical boxes can fit on display screen 602. In some cases, the size of card 602 may be adjusted to match the predefined size.

In some embodiments, rotating display screen 602 to a new orientation (e.g., rotating display screen 602 either 90 degrees clockwise of 90 degrees counterclockwise) causes grid interface 616 to display a new set of vertical lanes and a new set of horizontal lanes that fit the new orientation.

Figure 6D:
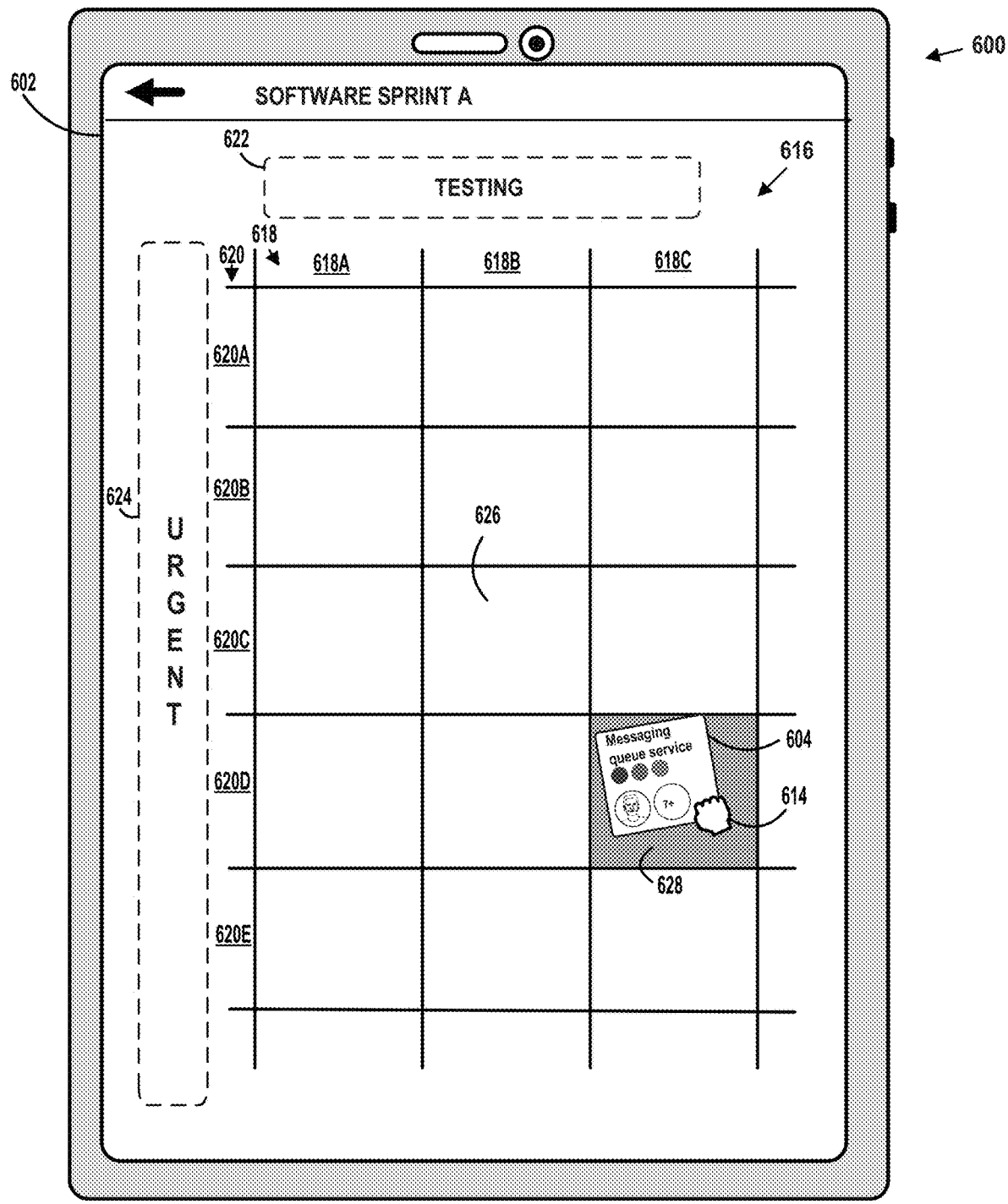
FIG. 6D depicts a view of a GUI, in accordance with example embodiments.

FIG. 6D depicts a view of GUI 600 with a reordered card, in accordance with example embodiments. The view of FIG. 6D may be displayed, for example, when a user drags the card 604 from graphical box 626 into graphical box 628. Such dragging is illustrated with drag icon 614. Notice that by sliding card 604 into graphical box 628, the content in vertical caption 622 and horizontal caption 624 is modified to reflect the categorical groups that define graphical box 628.

At this point, the user may choose to release card 604 via handle 614. Once card 604 is released, the categorical groups that define graphical box 628 may be assigned to card 604 and a record of this assignment may be transmitted to persistent storage on computational instance 322.

Figure 6E:
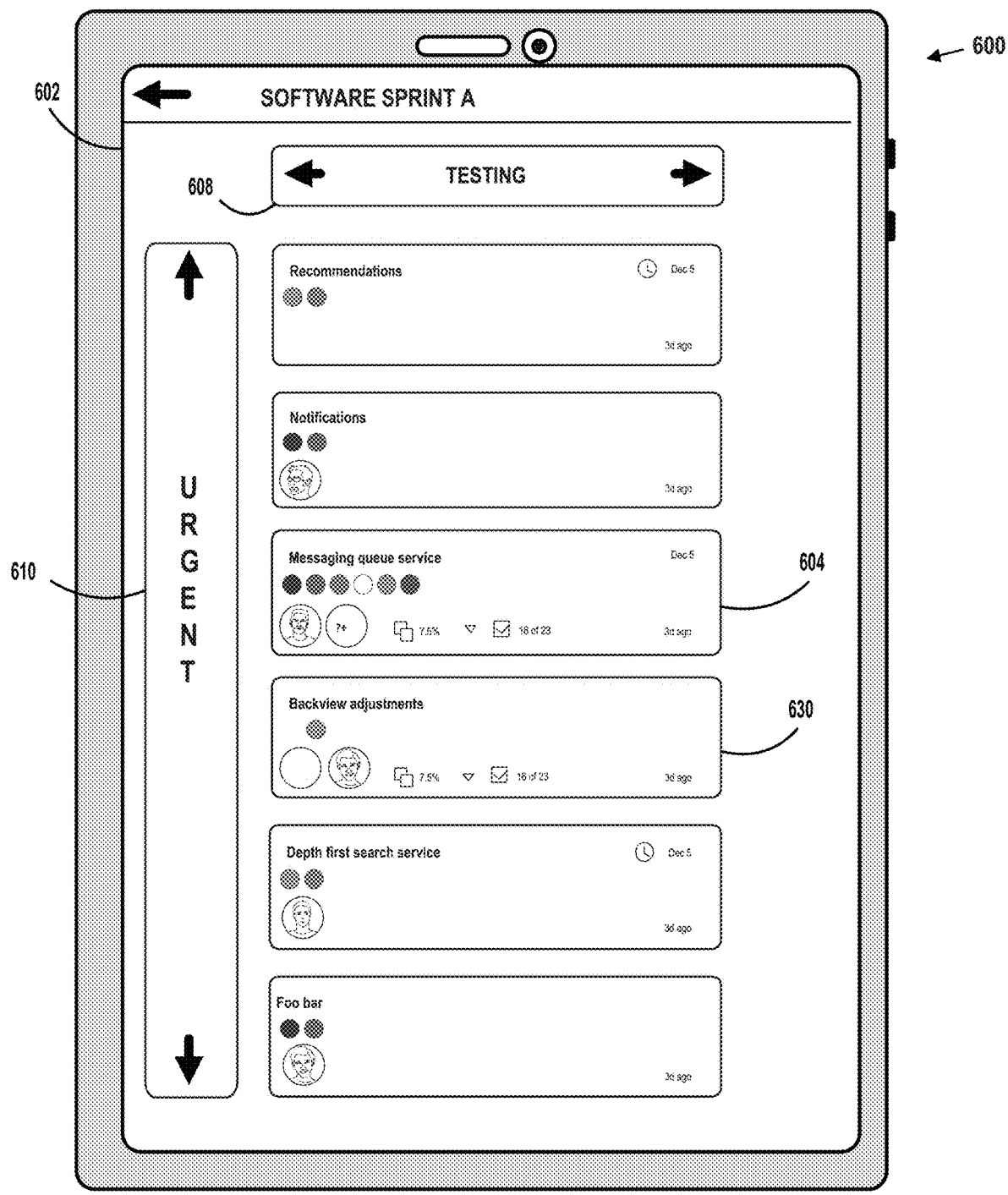
FIG. 6E depicts a view of a GUI, in accordance with example embodiments.

FIG. 6E depicts a view of GUI 600 with reordered cards, in accordance with example embodiments. The view of FIG. 6E may be displayed, for example, when a user releases the card 604 into graphical box 628. As shown in FIG. 6E, card 604 is now associated with the categorical group "Testing" and the second categorical group "Urgent". Moreover, the content of horizontal header 608 and vertical header 610 respectively match horizontal caption 622 and vertical caption 624 from FIG. 6D.

As may be seen by comparing FIG. 6E to FIG. 6D, the release of card 604 can cause the GUI 600 to display the cards associated with the new first categorical group from the plurality of first categorical groups and the new second categorical group from the plurality of second categorical groups. For example, FIG. 6E display cards with corresponding information items that are associated with the "Testing" and "Urgent" categorical groups. At this point, the user can decide to reorder another card, for example, card 630, or can decide, for the time being, to cease reordering cards.

VI. EXAMPLE OPERATIONS

FIG. 7 is a flow chart illustrating an example embodiment. The process illustrated by FIG. 7 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 7 may be simplified by the removal of any one or more of the features shown therein. Further, these embodiments may be combined with features, aspects, and/or implementations of any of the previous figures or otherwise described herein.

Block 700 involves obtaining, from persistent storage, data representing a definition of a first plurality of categorical groups, a definition of a second plurality of categorical groups, and a plurality of information items, each associated with one of the first plurality of categorical groups and one of the second plurality of categorical groups.

Block 710 involves transmitting, to a client device, the data and program code that instructs the client device to generate and display a graphical user interface using the data. The graphical user interface includes a set of cards representing information items associated with a first categorical group of the first plurality of categorical groups and a second categorical group of the second plurality of categorical groups. The graphical user interface is also configured such that the toggling, dragging, and releasing of a particular card of the set of cards causes the graphical user interface to: (i) in response to the toggling, automatically display a grid interface, wherein the grid interface contains a set of vertical lanes respectively associated with at least some of the first plurality of categorical groups and a set of horizontal lanes respectively associated with at least some of the second plurality of categorical groups, wherein intersections of vertical lanes and horizontal lanes define graphical boxes, where the particular card is initially located in a first graphical box of the graphical boxes, (ii) in response to the dragging, slide the particular card among the graphical boxes of the grid interface, and (iii) in response to the releasing, associate the information item represented by the particular card with a third categorical group of the first plurality of categorical groups or a fourth categorical group of the second plurality of categorical groups, where the particular card is released in a second graphical box of the graphical boxes that is defined by at least one of the third categorical group or the fourth categorical group.

In some embodiments, before the toggling, the set of cards are disposed within a vertical or horizontal row.

In some embodiments, before the toggling, names of the first categorical group and the second categorical group are respectively displayed vertically and horizontally adjacent to the set of cards.

In some embodiments, during the dragging of the particular card among the graphical boxes of the grid interface, the graphical user interface is configured to display names of categorical groups respectively associated with the graphical boxes that the particular card is being slid across.

In some embodiments, the releasing causes the graphical user interface to display a second set of cards representing information items associated with the third categorical group and the fourth categorical group, where the particular card is one of the second set of cards.

In some embodiments, the client device is a mobile client device with a display screen that has a diagonal length of 13 inches or less.

In some embodiments, the display screen has a diagonal length of 7 inches or less.

In some embodiments, the toggling comprises selecting and moving, by way of the graphical user interface, the particular card to an edge of the display screen.

In some embodiments, the graphical boxes have a predefined size that is based on a size of the display screen such that a predefined number of the graphical boxes can fit on the display screen, and where a size of the particular card is adjusted to match the predefined size.

In some embodiments, during display of the grid interface, a number of vertical lanes in the set of vertical lanes and a number of horizontal lanes in the set of horizontal lanes are each based on a size of the display screen.

In some embodiments, during display of the grid interface, sliding the particular card to an edge of the display screen causes the grid interface to display a new set of vertical lanes or a new set of horizontal lanes collectively containing at least one lane not in the set of vertical lanes or the set of horizontal lanes.

In some embodiments, rotating the display screen to a new orientation causes the grid interface to display a new set of verticals lanes and a new set of horizontal lanes that fit the new orientation.

Figure 8:
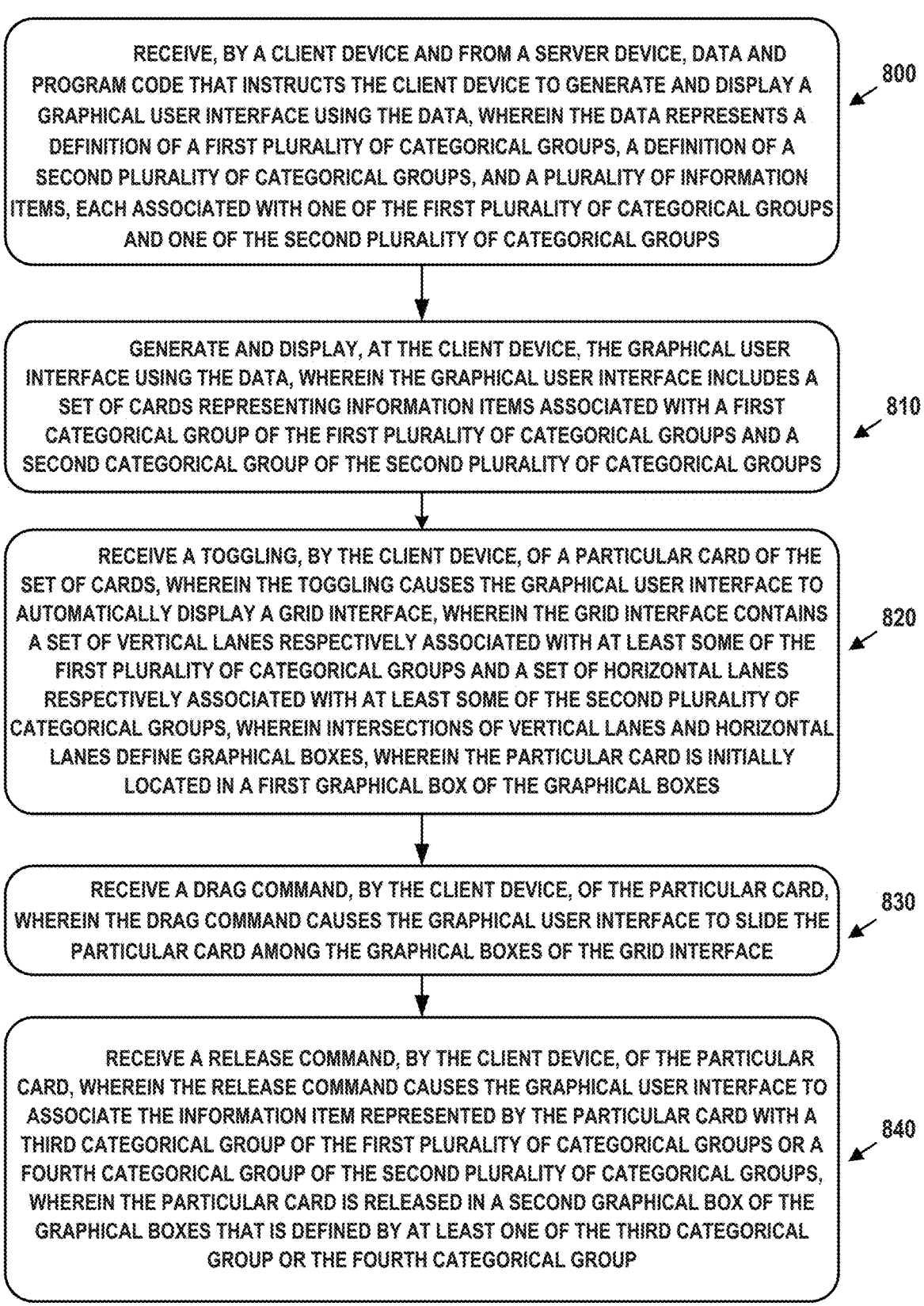
FIG. 8 is a flow chart, in accordance with example embodiments.

FIG. 8 is a flow chart illustrating a second example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 involves receiving, by a client device and from a server device, data and program code that instructs the client device to generate and display a graphical user interface using the data, where the data represents a definition of a first plurality of categorical groups, a definition of a second plurality of categorical groups, and a plurality of information items, each associated with one of the first plurality of categorical groups and one of the second plurality of categorical groups.

Block 810 involves generating and displaying, at the client device, the graphical user interface using the data, where the graphical user interface includes a set of cards representing information items associated with a first categorical group of the first plurality of categorical groups and a second categorical group of the second plurality of categorical groups.

Block 820 involves receiving a toggling, by the client device, of a particular card of the set of cards, where the toggling causes the graphical user interface to automatically display a grid interface. The grid interface contains a set of vertical lanes respectively associated with at least some of the first plurality of categorical groups and a set of horizontal lanes respectively associated with at least some of the second plurality of categorical groups, where intersections of vertical lanes and horizontal lanes define graphical boxes, and where the particular card is initially located in a first graphical box of the graphical boxes.

Block 830 involves receiving a drag command, by the client device, of the particular card, where the drag command causes the graphical user interface to slide the particular card among the graphical boxes of the grid interface.

Block 840 involves receiving a release command, by the client device, of the particular card, where the release command causes the graphical user interface to associate the information item represented by the particular card with a third categorical group of the first plurality of categorical groups or a fourth categorical group of the second plurality of categorical groups, where the particular card is released in a second graphical box of the graphical boxes that is defined by at least one of the third categorical group or the fourth categorical group.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
persistent storage containing data representing: a definition of a first plurality of categorical groups, a definition of a second plurality of categorical groups, and a plurality of information items, each associated with one of the first plurality of categorical groups and one of the second plurality of categorical groups; and
a server device configured to transmit, to a client device, the data and program code that instructs the client device to generate and display a graphical user interface using the data,
wherein the graphical user interface includes a set of cards representing information items associated with a first categorical group of the first plurality of categorical groups and a second categorical group of the second plurality of categorical groups, and
wherein toggling, dragging, and releasing of a particular card of the set of cards causes the graphical user interface to: (i) in response to the toggling, automatically display a grid interface, wherein the grid interface contains a set of vertical lanes respectively associated with at least some of the first plurality of categorical groups and a set of horizontal lanes respectively associated with at least some of the second plurality of categorical groups, wherein intersections of vertical lanes and horizontal lanes define graphical boxes, wherein the particular card is initially located in a first graphical box of the graphical boxes, (ii) in response to the dragging, slide the particular card among the graphical boxes of the grid interface, and (iii) in response to the releasing, associate the information item represented by the particular card with a third categorical group of the first plurality of categorical groups or a fourth categorical group of the second plurality of categorical groups, wherein the particular card is released in a second graphical box of the graphical boxes that is defined by at least one of the third categorical group or the fourth categorical group.

2. The system of claim 1, wherein, before the toggling, names of the first categorical group and the second categorical group are respectively displayed vertically and horizontally adjacent to the set of cards.

3. The system of claim 1, wherein, before the toggling, the set of cards are disposed within a vertical or horizontal row.

4. The system of claim 1, wherein, during the dragging of the particular card among the graphical boxes of the grid interface, the graphical user interface is configured to display names of categorical groups respectively associated with the graphical boxes that the particular card is being slid across.

5. The system of claim 1, wherein the releasing causes the graphical user interface to display a second set of cards representing information items associated with the third categorical group and the fourth categorical group, wherein the particular card is one of the second set of cards.

6. The system of claim 1, wherein the client device is a mobile client device with a display screen that has a diagonal length of 13 inches or less.

7. The system of claim 6, wherein the display screen has a diagonal length of 7 inches or less.

8. The system of claim 6, wherein the toggling comprises selecting and moving, by way of the graphical user interface, the particular card to an edge of the display screen.

9. The system of claim 6, wherein the graphical boxes have a predefined size that is based on a size of the display screen such that a predefined number of the graphical boxes can fit on the display screen, and wherein a size of the particular card is adjusted to match the predefined size.

10. The system of claim 6, wherein, during display of the grid interface, a number of vertical lanes in the set of vertical lanes and a number of horizontal lanes in the set of horizontal lanes are each based on a size of the display screen.

11. The system of claim 10, wherein, during display of the grid interface, sliding the particular card to an edge of the display screen causes the grid interface to display a new set of vertical lanes or a new set of horizontal lanes collectively containing at least one lane not in the set of vertical lanes or the set of horizontal lanes.

12. The system of claim 6, wherein rotating the display screen to a new orientation causes the grid interface to display a new set of verticals lanes and a new set of horizontal lanes that fit the new orientation.

13. A computer-implemented method comprising:
obtaining, from persistent storage, data representing a definition of a first plurality of categorical groups, a definition of a second plurality of categorical groups, and a plurality of information items, each associated with one of the first plurality of categorical groups and one of the second plurality of categorical groups; and
transmitting, to a client device, the data and program code that instructs the client device to generate and display a graphical user interface using the data, wherein the graphical user interface includes a set of cards representing information items associated with a first categorical group of the first plurality of categorical groups and a second categorical group of the second plurality of categorical groups, and wherein toggling, dragging, and releasing of a particular card of the set of cards causes the graphical user interface to: (i) in response to the toggling, automatically display a grid interface, wherein the grid interface contains a set of vertical lanes respectively associated with at least some of the first plurality of categorical groups and a set of horizontal lanes respectively associated with at least some of the second plurality of categorical groups, wherein intersections of vertical lanes and horizontal lanes define graphical boxes, wherein the particular card is initially located in a first graphical box of the graphical boxes, (ii) in response to the dragging, slide the particular card among the graphical boxes of the grid interface, and (iii) in response to the releasing, associate the information item represented by the particular card with a third categorical group of the first plurality of categorical groups or a fourth categorical group of the second plurality of categorical groups, wherein the particular card is released in a second graphical box of the graphical boxes that is defined by at least one of the third categorical group or the fourth categorical group.

14. The computer-implemented method of claim 13, wherein, during the dragging of the particular card among the graphical boxes of the grid interface, the graphical user interface is configured to display names of categorical groups respectively associated with the graphical boxes that the particular card is being slid across.

15. The computer-implemented method of claim 13, wherein the releasing causes the graphical user interface to display a second set of cards representing information items associated with the third categorical group and the fourth categorical group, wherein the particular card is one of the second set of cards.

16. The computer-implemented method of claim 13, wherein the client device is a mobile client device with a display screen that has a diagonal length of 13 inches or less.

17. The computer-implemented method of claim 16, wherein the toggling comprises selecting and moving, by way of the graphical user interface, the particular card to an edge of the display screen.

18. The computer-implemented method of claim 16, wherein the graphical boxes have a predefined size that is based on a size of the display screen such that a predefined number of the graphical boxes can fit on the display screen, and wherein a size of the particular card is adjusted to match the predefined size.

19. The computer-implemented method of claim 16, wherein, during display of the grid interface, a number of vertical lanes in the set of vertical lanes and a number of horizontal lanes in the set of horizontal lanes are each based on a size of the display screen.

20. A computer-implemented method comprising:
receiving, by a client device and from a server device, data and program code that instructs the client device to generate and display a graphical user interface using the data, wherein the data represents a definition of a first plurality of categorical groups, a definition of a second plurality of categorical groups, and a plurality of information items, each associated with one of the first plurality of categorical groups and one of the second plurality of categorical groups;
generating and displaying, at the client device, the graphical user interface using the data, wherein the graphical user interface includes a set of cards representing information items associated with a first categorical group of the first plurality of categorical groups and a second categorical group of the second plurality of categorical groups;
receiving a toggling, by the client device, of a particular card of the set of cards, wherein the toggling causes the graphical user interface to automatically display a grid interface, wherein the grid interface contains a set of vertical lanes respectively associated with at least some of the first plurality first categorical groups and a set of horizontal lanes respectively associated with at least some of the second plurality of categorical groups, wherein intersections of vertical lanes and horizontal lanes define graphical boxes, wherein the particular card is initially located in a first graphical box of the graphical boxes;
receiving a drag command, by the client device, of the particular card, wherein the drag command causes the graphical user interface to slide the particular card among the graphical boxes of the grid interface; and
receiving a release command, by the client device, of the particular card, wherein the release command causes the graphical user interface to associate the information item represented by the particular card with a third categorical group of the first plurality of categorical groups or a fourth categorical group of the second plurality of categorical groups, wherein the particular card is released in a second graphical box of the graphical boxes that is defined by at least one of the third categorical group or the fourth categorical group.

* * * * *